Nov. 17, 1925.
C. T. ALLCUTT ET AL
1,561,897
AUTOMOBILE TIRE CHAIN CONNECTER
Filed Feb. 6, 1922
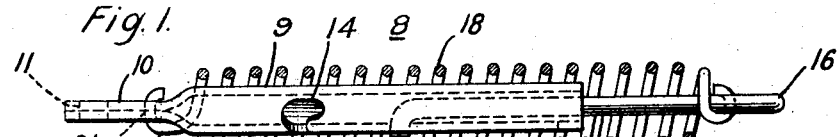
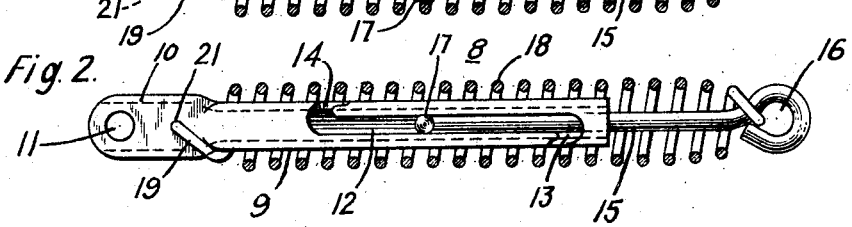
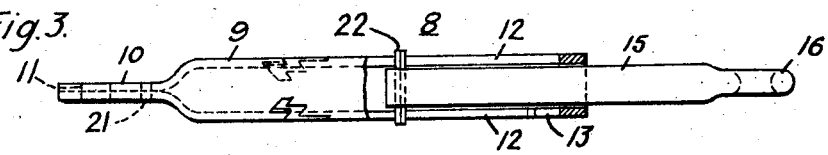
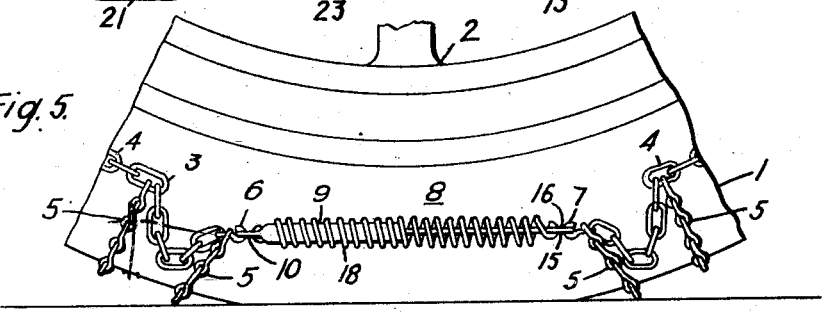
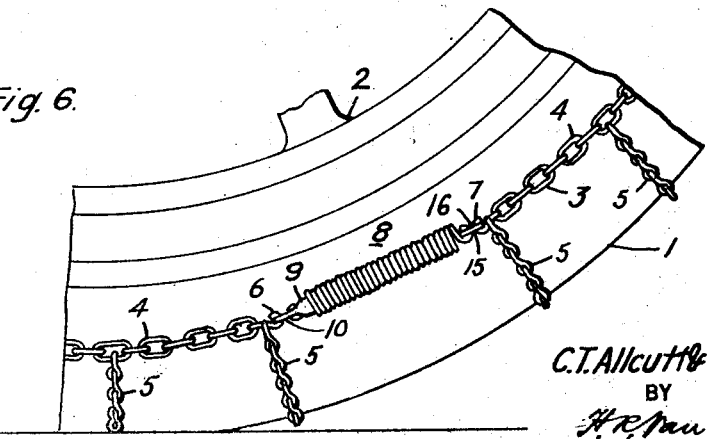
INVENTORS
C.T. Allcutt & H.R. Van Deventer
BY
H.R. Van Deventer
ATTORNEY Patented Nov. 17, 1925.

1,561,897

UNITED STATES PATENT OFFICE.

CHESTER T. ALLCUTT AND HARRY R. VAN DEVENTER, OF PITTSBURGH, PENNSYLVANIA.

AUTOMOBILE TIRE-CHAIN CONNECTER.

Application filed February 6, 1922. Serial No. 534,334.

*To all whom it may concern:*

Be it known that we, CHESTER T. ALLCUTT, a citizen of the United States, and a resident of Pittsburgh, in the county of Allegheny and State of Pennsylvania, and HARRY R. VAN DEVENTER, a citizen of the United States, and a resident of Pittsburgh, in the county of Allegheny and State of Pennsylvania, have invented a new and useful Improvement in Automobile Tire-Chain Connecters, of which the following is a specification.

Our invention relates to connecters and particularly to means for connecting the ends of automobile tire chains.

One object of our invention is to provide a device of the above-indicated character that shall be simple and durable in construction, effective in operation and economical in its manufacture.

Another object of our invention is to provide an automobile tire chain connecter that shall permit the mounting of the chains without raising or turning the wheels.

Another object of our invention is to provide an automobile tire chain connecter that shall permit a tire chain to be relatively quickly and easily placed on a tire, in partially operatively connected condition, and that shall automatically complete the operative connection when the automobile is operated under its own power, or is otherwise moved.

A further object of our invention is to provide an extensible connecter that shall be so contractable and that shall so embody manual and automatic locking features as to render very easy the operations of connecting members that may normally be brought together only with great difficulty.

The mounting of anti-skid chains on the tires of automobiles has, to the best of our knowledge, heretofore been a tedious and difficult operation, especially where a tire to be so-equipped is in operative position on an automobile and resting on the ground under the weight of the car. When in such position, the chain is usually draped or hung over the tire and the car is either jacked up to raise the car from the ground or is moved on its wheel to turn one end of the chain under the tire and out on the opposite side to permit joinder of the chain ends. Another method of mounting the chains is to place the chains on the ground or floor and to move the car so as to position the wheels over the chains.

In any instance, considerable difficulty is usually encountered and an undue amount of labor expended.

It is our aim to overcome the above-mentioned difficulties by providing an improved connecter by the use of which it becomes unnecessary to either employ a jack or to push or drive the car in any manner during the operator's part of mounting the chains.

In practicing our invention, we provide an extensible connecter which may be stretched or extended to join the ends of a tire chain, while the latter are somewhat distantly removed from each other or positioned on opposite sides of the ground-engaging portion of a tire. The connecter preferably embodies a relatively stiff helical spring and means for holding or locking it in extended condition to facilitate the joinder of the distant chain ends.

When so joined and the means for locking it in extended condition is released, the connecter is in condition to automatically contract to locked position, wherein the chain is properly and securely mounted on the tire, when the car is started on, or resumes, a trip. In other words, the connecter responds to a usual movement of the car and does not require jacking or back and forth shifting to complete the operation of mounting a chain. Further, the above-mentioned means for locking or holding the connecter in extended condition may be released by either a relatively slight movement of the operator's hand or by a slight twisting or jarring movement which will occur when the car is started.

Fig. 1 of the accompanying drawing, is a longitudinal or plan view, partially in section, of a connecter constructed in accordance with our invention.

Fig. 2 is a side view, partially in section, of the device shown in Fig. 1.

Fig. 3 is a view, similar to Fig. 1, of a modified form of our invention, with parts omitted.

Fig. 4 is a side view of the device shown in Fig. 3.

Fig. 5 is a fragmentary view of an automobile wheel, tire and chain, showing the connecter of our invention in extended condition and joined to the remote ends of the chain, and Fig. 6 is a view, similar to Fig. 5, showing the connecter in contracted and locked position after the wheel has turned.

As illustrated in Figs. 5 and 6, an automobile tire 1, mounted on a wheel 2, is adapted to receive a usual multi-part linked chain device 3 comprising parallel side chains 4, only one of which is shown, that are disposed on opposite sides of the tire and joined by a plurality of perimetrically spaced relatively short cross link sections 5, in a usual and well-known manner.

As may be seen in Fig. 5, opposite ends 6 and 7 of one of the side chains 4 may ordinarily not be brought sufficiently close together, by reason of the position of the wheel on the floor or ground, to connect the same by ordinary means and other expedients have heretofore been resorted to. One method of mounting the device 3 has heretofore been to jack up the vehicle so as to permit the ends 6 and 7 to be brought together under, or at other position on, the wheel 2. Another method has been to place the device 3 in longitudinally extended position on the floor or ground and to push or drive the vehicle to proper position thereover. A further method has been to place the device 3 on the tire 1, somewhat as viewed in Fig. 5, and to push or drive the vehicle over one of the ends 6 and 7 so as to bring the ends in juxtaposition at one side of the wheel.

In any of the above-described methods, a great deal of unnecessary labor and loss of time are entailed, besides the inconvenience of such manipulation even when effected under the most favorable circumstances.

We propose to overcome all of the above-described difficulties and to render the operation of mounting a vehicle tire chain extremely simple and expeditious by the use of a connecter 8 embodying our invention.

As shown in Figs. 1, 2, 5 and 6, the connecter 8 comprises a tubular link or terminal member 9 having a flattened end portion 10 and a hook or eye 11 for the reception of one of the ends 6 or 7 of the side chain 4, shown in this instance as connected to the end 6. The tubular member 9 is provided with a longitudinal slot 12, in one side thereof, having a laterally-extending opening or notch 13, at one end, and a similar oppositely laterally-extending opening 14, at the other end. A link, bar or plunger rod 15, having a hook or eye portion 16 at its outer or free end for the reception of the opposite end 7 of the portion 4, is disposed longitudinally in the tube 9 and is provided, at its inner end, with a laterally-projecting or hook portion 17 that extends through the slot 12. A helical spring member 18 is secured, at its end 19, to the flattened portion 10 of the member 9 and extends around and along the latter to the eye portion 16 of the plunger rod 15, around which the opposite end 20 of the spring 18 is bent or hooked.

The end 19 of the spring 18 is hooked through an opening 21 in the portion 10 and extends from one side of the latter to the opposite side of the eye portion 16, at the opposite end of the device. The spring 18 is mounted in position while under torsional stress so that the tubular member 9 and the rod 15 tend to turn relatively to each other. The spring 18 is also stressed longitudinally and tends to draw the rod 15 into the tubular member 9.

In operation, after the tire chain 3 has been placed on the tire from above, the ends 6 and 7 of the portion 4 are brought as close together as permissible in view of the position of the wheel 1 on the floor or ground, somewhat after the manner shown in Fig. 5.

The connecter 8 may, at any time before or after the above operation, be so extended against the inward-drawing tendency of the spring 18 as to permit the hook portion 17 thereof to be turned, against the torsional bias of the spring, into the notch 13. The latter is slightly undercut, in the direction of contraction of the spring, to hold the connecter in extended condition against the torsional bias of the spring with sufficient security to permit its being safely handled during the mounting operation. With the connecter so extended, it is of such length as to permit the ends 6 and 7, when in the above-described relation as shown in Fig. 5, to be easily connected at the bottom of the tire 1, without jacking up or moving the vehicle in any manner. When the device is connected, the operator pulls one end of the device so as to release the end 17 of the plunger 15 from the under cut portion of the notch 13. The torsional bias of the spring 18 then throws the end 17 into the straight portion of the slot 12, and the device is no longer locked in the extended position.

With the completion of the above-described operations the operator's part in mounting the chain is completed and he need not give it any further attention.

When the vehicle is thereafter moved on its wheels in a usual manner, the wheel 1 will run over one of the end cross-link chain sections 5, as illustrated in Fig. 6, to thus render both of the end cross-link sections 5 free to move toward each other. If the hook portion 17 has been previously moved out of the notch 13, by a slight hand manipulation, as described above, the connecter 8 will contract to a condition, illustrated in Fig. 6, in which the hook portion 17 has been moved, by the longitudinal and torsional bias of the spring 18, into the notch 14. Thus, the ends 6 and 7 of the chain 3 are automatically drawn to the final operative position thereof on the tire 1 and automatically locked against displacement therefrom.

If the hook portion 17 has not been previously moved out of the notch 13, by hand manipulation, it will move out of its own accord in response to jarring of the moving vehicle or in response to any slight stretching of the spring 18 caused by the centrifugal force of the moving tire and the automatic contracting and locking operation will be completed as above described.

Further, since the slot 12 is closed at its end adjacent to the notch 13, there is no likelihood of separating the members 9 and 15 or of stretching the spring 18 beyond its elastic limit. This feature also ensures that the chain 3 will not be thrown off the wheel, should any adverse influence tend to prevent the operation of the connecter 8.

In the form of our invention, shown in Figs. 3 and 4, in which similar reference characters represent similar parts, the spring 18 has been omitted for clearness. In this form of the connecter 8, the tubular member 9 is provided with a pair of the slots 12 oppositely disposed thereabove and each having the notch 13 therein. The plunger rod 15, instead of having the single hook portion 17, is a straight rod or bar having a pin 22 extending therethrough, at its inner end, and through the slots 12. Also, instead of the single inner locking notch 14, each of the slots 12 communicates with a multi-step notch or opening 23, the steps 24, 25 and 26 of which are successively offset both longitudinally and laterally. With this construction, the pin 22 will be locked in accordance with the amount of movement required to move the chain ends 6 and 7 together and is preferably adapted to initially lock in the notch 24. After thus locked, if the chain 3 increases in length, as frequently occurs, the increased length will be automatically taken up by the movement of the pin 22 into the next notch 25, and so on. The notches 24, 25, etc., may obviously be of any size or number to effect any desired degree of adjustment of the chain.

The connecter of our invention is exceedingly simple, rugged and durable in construction and economical to manufacture. By its use, the operation of mounting the chain is facilitated to a high degree, the chains are effectively held in proper position and a desirable automatic compensation for expansion or stretching of the chains is obtained.

While we have shown and described particular forms of our invention, changes may be effected therein without departing from the spirit and scope thereof, as set forth in the appended claims.

We claim as our invention:

1. A device for connecting the ends of a vehicle tire chain comprising an extensible structure normally resiliently biased to contracted condition, means for holding the same in extended position and means for automatically locking the structure in contracted condition when released from said held position.

2. A connecter comprising two eye members, a connecting helical spring biased to contracted condition and means for locking the same in predetermined extended condition.

3. A connecter comprising two eye members, a helical spring connecting the same biased to contracted condition, means for locking the same in predetermined extended condition and means for locking the same in contracted condition.

4. A connecter comprising two eye members, a helical spring connecting the same biased to contracted condition, means for locking the same in predetermined extended condition and means for automatically locking the same in contracted condition.

5. A connecter comprising two eye members, a helical spring connecting the same biased to contracted condition, means for locking the same in extended condition, means for preventing the extension thereof beyond a predetermined limit and means for locking the same in contracted condition.

6. A connecter comprising two eye members, a helical spring connecting the same having means for locking the same against displacement in predetermined extended and contracted conditions, said means effecting one of said locking actions automatically.

7. A connecter comprising two eye members, a helical spring connecting the same having means for locking the same against displacement in predetermined extended and contracted conditions, said means effecting one of said locking actions automatically, and means for preventing the extension thereof beyond a predetermined limit.

8. In an automobile tire-chain connecter comprising a tubular terminal member having a longitudinal slot and a lateral opening intercepting the slot, a second terminal member having a portion disposed in the tube and a laterally extending portion in the slot, and a helical spring for drawing the terminal members together and having torsional bias to move said laterally-extending portion into said lateral opening.

9. An automobile tire-chain connecter comprising a tubular terminal member having a longitudinal slot extending between positions inwardly removed from each end thereof and a lateral opening intercepting the slot, a second terminal member having a portion disposed in the tube and a laterally-extending portion in the slot, and a helical spring connected between the terminal members to draw the same together and having torsional bias to move said laterally extending portion into said lateral opening.

10. An automobile tire-chain connecter comprising a tubular terminal member having a longitudinal slot and a plurality of oppositely extending lateral openings intercepting the slot, a second terminal member having a portion disposed in the tube and a laterally-extending portion in the slot, the latter portion co-operating with one of said lateral openings to hold the connecter in extended condition, and a helical spring connected between the terminal members to draw the same together and having torsional bias to move said laterally-extending portion into the other lateral opening.

11. An automobile tire-chain connecter comprising a tubular terminal member having a longitudinal slot extending between positions inwardly removed from each end thereof and a stepped lateral opening intercepting the slot, a second terminal member having a portion disposed in the tube and a laterally-extending portion in the slot, and a helical spring connected between the terminal members to draw the same together and having torsional bias to move said laterally-extending portion into said lateral opening.

12. An automobile tire-chain connecter comprising telescoped terminal members, a lock portion on one thereof, a plural-position lock-receiving portion on the other and a helical spring connecting said members to draw the same together and having torsional bias to move said lock portion into locking relation to one of said positions of the lock-receiving portion in accordance with the degree of approach permitted by the connected tire-chain ends.

13. A connecter comprising a helical tension spring and means for locking the spring in both extended and contracted condition, the said spring being under torsional strain to facilitate unlocking from its extended condition and to automatically lock it in its contracted condition.

14. A connecter comprising a helical tension spring, and mean for locking the spring in both extended and contracted conditions, the said spring being under tension in both its extended and contracted conditions and also under torsional strain to facilitate unlocking from its extended condition and to automatically lock it in its contracted condition.

15. A tire-chain connecter comprising a helical tension spring, means for connecting its ends to the ends of a chain, and two relatively movable members surrounded by and respectively attached to, the ends of the spring, and provided with means whereby the spring may be locked in both extended and contracted conditions, the said spring being under torsional strain to facilitate unlocking from its extended condition and to automatically lock it in its contracted condition.

In testimony whereof, we have hereunto subscribed our names this 4th day of February, 1922.

CHESTER T. ALLCUTT.
HARRY R. VAN DEVENTER.